United States Patent [19]

Wagner et al.

[11] 4,037,232
[45] July 19, 1977

[54] VISUAL EXPOSURE INDICATOR IN PHOTOGRAPHIC APPARATUS

[75] Inventors: Karl Wagner, Ottobrunn; Bernhard von Fischern, Munich, both of Germany

[73] Assignee: AGFA-Gevaert, A.G., Leverkusen, Germany

[21] Appl. No.: 324,896

[22] Filed: Jan. 18, 1973

Related U.S. Application Data

[63] Continuation of Ser. No. 59,998, July 31, 1970, abandoned.

[51] Int. Cl.² .................................................. G03B 17/20
[52] U.S. Cl. .................................... 354/23 R; 354/53
[58] Field of Search ............ 95/10 C, 10 CE, 10 CT; 356/224, 226, 227; 354/23, 48, 53, 60

[56] References Cited

U.S. PATENT DOCUMENTS

| | | | |
|---|---|---|---|
| 3,436,158 | 4/1969 | Schmitt | 356/226 |
| 3,460,450 | 8/1969 | Ogihara | 95/10 CT |
| 3,487,757 | 1/1970 | Kiper | 95/10 CT |
| 3,516,750 | 6/1970 | Schmitt | 356/224 |
| 3,532,035 | 10/1970 | Fujii | 95/10 CE |
| 3,581,643 | 6/1971 | Yoshimura | 95/10 CE X |
| 3,603,799 | 9/1971 | Nobusawa | 95/10 CT X |
| 3,662,659 | 5/1972 | Metzger et al. | 95/10 CT |
| 3,895,876 | 7/1975 | Mori | 354/24 |

*Primary Examiner*—L. T. Hix
*Assistant Examiner*—William B. Perkey
*Attorney, Agent, or Firm*—Michael J. Striker

[57] ABSTRACT

Three electric lamps with different voltage-illumination thresholds are connected to be successively turned on to show exposure times by an electronic switch, such as a transistor, connected to a voltage divider composed of a photoconductor, exposed to scene light, and a resistor.

5 Claims, 4 Drawing Figures

VISUAL EXPOSURE INDICATOR IN PHOTOGRAPHIC APPARATUS

This is a continuation, of application Ser. No. 59,998, filed July 31, 1970 now abandoned.

BACKGROUND OF THE INVENTION

The invention relates to photographic apparatus having means for visually indicating exposure values, such as the setting of the diaphragm or the exposure time.

Such photographic apparatus commonly also incorporates an automatic electronic exposure control unit comprising a photosensitive element and a capacitor that is connected to the input to this unit and which is charged to determine the exposure time.

There is known a camera of this kind having a measuring instrument for showing the exposure values, the instrument being connected in series with the photosensitive element before an exposure is made.

SUMMARY OF THE INVENTION

An object of the invention is an arrangement for visually indicating exposure values, such as exposure times or diaphragm settings, but which arrangement does not have a measuring instrument.

Another object of the invention is an arrangement of the preceding object that operates reliably, is simple in construction, and clearly shows the exposure values to the photographer.

The invention essentially consists of electric circuit means for visually indicating exposure values, the circuit means including light source means capable of being energized to a plurality of conditions, each condition producing a different visual signal indicative of a different exposure value, photosensitive means exposed to scene light, and automatic first switch means in circuit with the photosensitive means and with the light source means for determining the condition of the latter, in dependence on the amount of scene light incident on the photosensitive means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
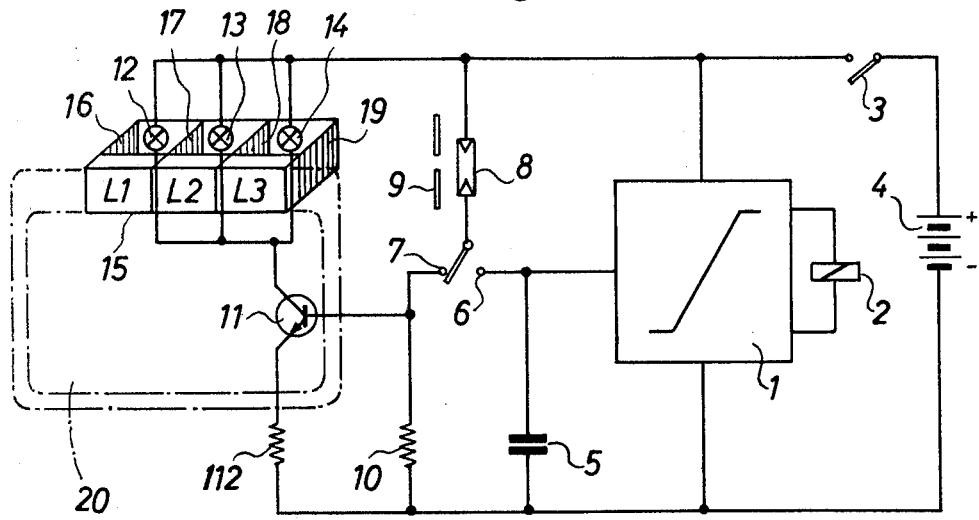
FIG. 1 is a circuit diagram showing a first embodiment of the invention.

With reference to FIG. 1, there is shown a first embodiment having an electronic exposure control unit, as well as an arrangement for visually showing the exposure value. The term exposure value is intended to mean either the exposure time or the setting of the diaphragm.

The reference numeral 1 denotes an exposure control unit, such as described in the copending patent applications of Wagner et al.

The output of the exposure control unit 1 is connected to a camera shutter control magnet 2 which, in a manner not shown, releases the shutter blade after a delay time. A switch 3, which, for example, can be operated by the release (not shown), connects the unit 1 to a voltage source 4. Connected to the input to the unit 1 is a capacitor 5, which a contact 6 of a switch 6, 7 connects in series with a photoconductor 8. The switch 6, 7 is operated, in a manner not shown, by the release on the camera. There is arranged in front of the photoconductor 8 a diaphragm 9, which influences the exposure time by the presetting of the diaphragm opening.

The photoconductor 8 can be connected in series with a fixed resistor 10 by the contact 7 of the switch 6, 7. The photoconductor 8 and the resistor 10 form a first voltage divider of which the common junction is connected to the base of controlled impedance means, here a transistor 11. A resistor 112 is connected in the emitter circuit of this transistor. Three lamps 12, 13 and 14 are connected in the collector circuit of transistor 11. These lamps are connected in parallel, and each corresponds to a different, adjustable exposure value, in the present case to a different, adjustable exposure time. Each of the lamps is voltage-sensitive and has a different voltage-illumination threshold. Consequently, depending on the voltage on the base of the transistor 11, only one lamp lights up, such as lamp 12, or two lamps light up, such as 12 and 13, or all three lamps light up. Each of the lamps is held in a compartment in the camera. These compartments comprise a transparent scale 15 facing the photographer. The reference numerals 16, 17, 18 and 19 denote the side walls of these compartments.

The scale 15 incorporates exposure time markings L1, L2 and L3. The marking L1, for example, corresponds to the shortest of the exposure times, L2 to an exposure of middle length, and L3 to the longest exposure possible without using a tripod. A viewfinder 20 is shown in dot-dash lines. Components 3, 4, 7, 10, 11, 112 form circuit means for controlling the illumination or non-illumination of the light sources 12, 13 and 14.

The circuit described operates in the following manner. If the scene light is very bright, the photo-conductor 8 has a small resistance, so that the base of transistor 11 is positive with respect to the emitter, whereby the transistor is turned on hard. Consequently, there is a relatively large voltage across the lamps 12, 13 and 14. All three lamps light up, and the photographer sees a long band of light.

If the scene light is somewhat less bright, the voltage between the base and the emitter of transistor 11 is smaller, so that the transistor is not turned on as completely as before, there appears across the lamps 12–14 a smaller voltage, so that only the lamps 13 and 14 light up. The photographer therefore sees a shorter light band.

If there is even less light by which to photograph, the voltage between the base and emitter of transistor 11 is still smaller, so that the transistor is even less conductive. The voltage across the lamps 12–14 is smaller than before, so that only the lamp 14 lights up.

If the photoconductor 8 takes the place of the resistor 10, and the resistor 10 takes the place of the photoconductor 8, there will be obtained, as against the embodiment shown in FIG. 1, a long band of light when little scene light is present, a somewhat shorter band of light when more scene light is present, and when the scene light is very bright a short band of light.

The exposure timing is obtained by operating the switch 6, 7 and thereby connecting the photoconductor 8 in series with the capacitor 5. The circuit then operates generally in the manner described in the previously quoted patent applications.

Figure 2:
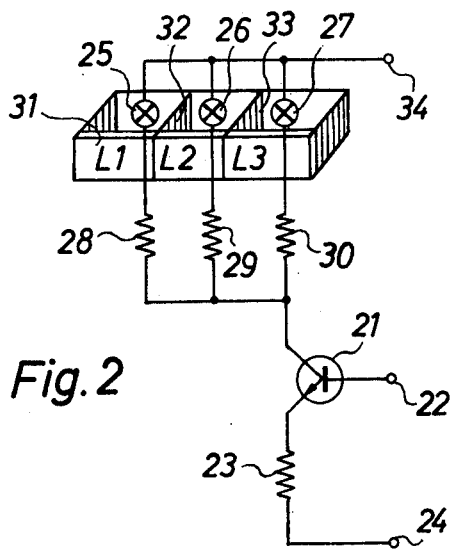
FIG. 2 is a circuit diagram showing a second embodiment of the invention.

FIG. 2 shows a second embodiment having three lamps with the same voltage-illumination threshold. Connected in series with these lamps are respective reistors of different values.

The reference numeral 21 denotes a transistor, the base of which is connected to the common junction 22 of the voltage divider (see FIG. 1) composed of the photoconductor 8 and the resistor 10. A resistor 23, which corresponds to the resistor 12 shown in FIG. 1, is connected to the emitter. The terminal 24 connects the resistor 23 to the negative pole of the voltage source 4. Three lamps 25, 26 and 27 are connected in the collector circuit of transistor 21. Connected in series with these lamps are respective resistors 28, 29 and 30, each resistor having a different resistance value. The resistor 28, for example, has the largest resistance value, the resistor 29 a smaller value, and the resistor 30 the smallest value. A transparent scale 31 is arranged in front of the lamps 25–27, as in the embodiment shown in FIG. 1. The lamps 25–27 are separated from each other by opaque walls 32 and 33. The lamps are connected in common by a terminal 34 to the photoconductor 8.

This embodiment works in the same manner as the embodiment shown in FIG. 1.

Figure 3:
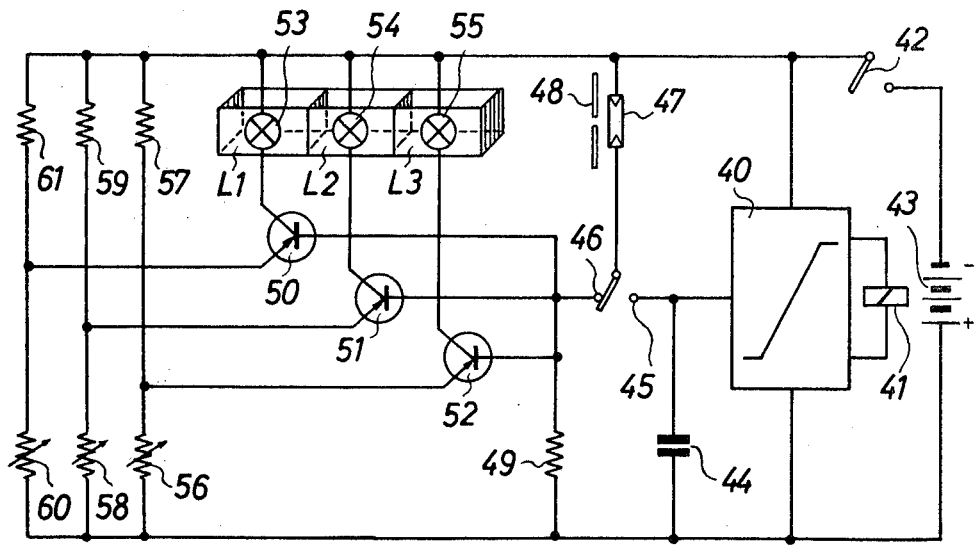
FIGS. 3 and 4 are circuit diagrams showing two additional embodiments of the invention.

A third embodiment is shown in FIG. 3. The electronic exposure control unit 40 comprises a conventional trigger stage. A shutter-control magnet 41 is connected to the output of the unit 40. A switch 42 connects the unit 40 to the minus pole of a voltage source 43. The input of the unit 40 is connected to a capacitor 44, which can be connected in series with a photoconductor 47 by a contact 45 of a switch 45, 46. A diaphragm 48 is arranged in front of the photoconductor 47. To obtain the exposure timing, the photoconductor 47 is connected in series to a resistor 49 by the contact 46 of a switch 45, 46.

The contact 46 is connected to each base of three transistors 50, 51 and 52. A respective lamp 53, 54, or 55 is connected to the collectors of these transistors. Each lamp is housed in a separate compartment, the compartments together having a transparent scale that faces the photographer. The scale corresponds to the scale of the embodiment shown in FIG. 1.

The lamp 53, for example, corresponds to the shorter exposure time L1, the lamp 54 to the exposure time L2 of middle duration, and the lamp 55 to the longest exposure time L3.

The emitter of transistor 52 is connected to the common junction of the further voltage divider composed of the resistors 56 and 57, the emiter emitter transistor 51 to the common junction of the further voltage divider composed of the resistors 58 and 59, and the emitter of transistor 50 to the common junction of the further voltage divider composed of the resistors 60 and 61. These further voltage dividers form voltage-setting means for setting the omitter voltages of transistors 5–52.

The variable resistors 56, 58 and 60 are set at such values that when the scene light is weak, and therefore the voltage across resistor 49 is small, only transistor 52 is turned on, and the two remaining transistors 50 and 51 do not conduct. Consequently, only the lamp 55 for the exposure time L3 turns on.

With somewhat brighter scene light the voltage across resistor 49 is sufficiently large so that transistor 51 also turns on. Therefore, the two lamps 54 and 55 burn.

If the scene light is very bright, the transistor 50 also turns on, so that all three transistors are conducting. Consequently, the lamp 53 is also illuminated.

Further operation of the camera release opens the contact 46 and closes the contact 45. The visual indicator for the exposure time is therefore disconnected, and the photoconductor 47 is connected to the exposure control unit 40. The exposure timing follows in a known manner.

Figure 4:
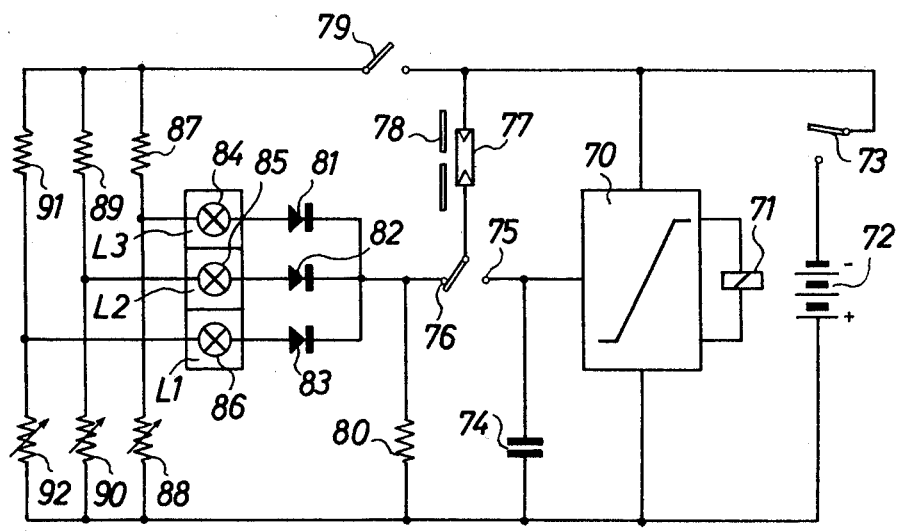

A fourth embodiment of the invention is shown in FIG. 4. The output of an exposure control unit 70 is connected to a shutter-control magnet 71. The reference numerals 72 and 73 respectively denote a voltage source and a switch operated by the camera release. A capacitor 74 is connected to the input of the unit 70. A switch is denoted by the reference numerals 75 and 76. The photoconductor 77 has arranged in front of it a diaphragm 78. The visual indicator is connected by a switch 79 to the voltage source 72. The switch 79 can be operated for example by the release, not shown. A contact 76 of the switch 75, 76 connects the photoconductor 77 in series with a resistor 80. The photoconductor 77 and the resistor 80 compose a voltage divider, the common junction of which is connected to three diodes 81, 82 and 83. Connected in series with these diodes is a respective lamp 84, 85 and 86.

The lamp 84 is connected to the common junction of a voltage divider 87, 88, the lamp 85 to the common junction of another voltage divider 89, 90, and the lamp 86 to the common junction of a third voltage divider 91, 92. The variable resistors 88, 90 and 92 are set at such values that with low scene light only the diode 83 conducts, with greater scene light the diodes 82 and 83 conduct, and with very bright scene light all three diodes conduct. Consequently, with low scene light only the lamp 83 lights up to produce a short band of light, whereas with greater scene light the lamps 85 and 86 light up and with bright scene light the three lamps 84–86 light up.

In the embodiment shown in FIGS. 3 and 4, the light band can be made progressively longer for longer exposure times by reversing the positions of the resistors 49 or 80, on the one hand, and the photoconductors 47 and 77, on the other. That is, in the embodiment shown in FIG. 3, for example, the resistor 49 is connected where the photoconductor 47 is connected, and the photoconductor 47 is connected where the resistor 49 is connected, as shown in FIG. 3.

In accordance with the invention, it is possible, for example, by suitably constructing the camera release, to hold the switch 79 closed only so long as the contact 76 is closed. In this way, the switch 79 is closed only as long as the arrangement of the invention visually shows the exposure time.

The light sources of the invention can be conventional lamps of any suitable design, or they can be semiconductor elements capable of giving off light.

The invention is useful for showing the exposure value, such as the exposure time, and thereby enabling the photographer to determine whether one or more of the adjustable factors, which influence exposure time and are under his control, are correctly set.

It will be understood that each of the elements described above, or two or more together, may also find a useful application in other types of constructions differing from the types described above.

While the invention has been illustrated and described as embodied in a visual exposure indicator in a photographic apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent and is set forth in the appended claims:

1. In a photographic camera, in combination, light-sensing means for sensing the prevailing scene brightness and for generating a light-dependent voltage having at least a first voltage value, a second voltage value greater than said first value, and a third voltage value greater than said second value, corresponding respectively to first, second and third levels of scene brightness; an automatic exposure control unit operative for automatically selecting as a function of prevailing scene brightness any one of a plurality of exposure values including a first, a second and a third exposure value respectively corresponding to said first, second and third levels of scene brightness; and at least a first, a second and a third light source means comprising respective light sources connected in parallel and each having a first condition and a second condition, one of said conditions being an illuminating condition and the other of said conditions being a non-illuminating condition, each connected to said light-sensing means for simultaneous receipt of said light-dependent voltage, and said first, second and third light source means being operative for assuming said first condition whenever and while said light-dependent voltage exceeds said first, second and third voltage values, respectively, whereby while said automatic exposure control unit selects said first exposure value said first light source means is in said first condition and said second and third light source means are in said second condition, and while said automatic exposure control unit selects said second exposure value said first and second light source means are in said first condition and said third light source means is in said second condition, and while said automatic exposure control unit selects said third exposure value said first, second and third light source means are all in said first condition, said light-sensing means comprising impedance means connected to said light sources for varying the impedance in the current path of said light sources as a function of prevailing scene brightness, comprising a transistor having a collector-emitter path connected in series with the parallel combination of said light sources, and having a base constituting an input of said impedance means, said light-sensing means further comprising a light-sensitive resistor, a voltage source, and an additional resistor in series with said light-sensitive resistor and forming therewith a voltage divider connected across said voltage source and having a tap connected to said input of said impedance means.

2. In a photographic camera, in combination, light-sensing means for sensing the prevailing scene brightness and for generating a light-dependent voltage having at least a first voltage value, a second voltage value greater than said first value, and a third voltage value greater than said second value, corresponding respectively to first, second and third levels of scene brightness; an automatic exposure control unit operative for automatically selecting as a function of prevailing scene brightness any one of a plurality of exposure values including a first, a second and a third exposure value respectively corresponding to said first, second and third levels of scene brightness; and at least a first, a second and a third light source means each having a first condition and a second condition, one of said conditions being an illuminating condition and the other of said conditions being a non-illuminating condition, each connected to said light-sensing means for simultaneous receipt of said light-dependent voltage, and said first, second and third light source means being operative for assuming said first condition whenever and while said light-dependent voltage exceeds said first, second and third voltage values, respectively, whereby while said automatic exposure control unit selects said first exposure value said first light source means is in said first condition and said second and third light source means are in said second condition, and while said automatic exposure control unit selects said second exposure value said first and second light source means are in said first condition and said third light source means is in said second condition, and while said automatic exposure control unit selects said third exposure value said first, second and third light source means are all in said first condition, said light-sensitive means comprising a light-sensitive resistor, a voltage source, an additional resistor in series with said light sensitive resistor and forming therewith a voltage divider connected across said voltage source and having a voltage divider tap, and said first, second and third light source means comprising respective first, second and third light sources and respective first, second and third controlled impedance means each having an input connected to said voltage divider tap and each connected to the respective one of said light sources and operative for permitting the respective light source to become illuminated only when the voltage at said voltage divider tap has reached a predetermined one of said first, second and third voltage values, each of said controlled impedance means comprising a transistor having a base connected to said voltage divider tap, a collector connected to the respective light source and an emitter, and said first, second and third light source means together comprising further voltage-setting means for setting the emitter voltage of each of said transistors of said controlled impedance means in such a manner that each time the change of scene brightness results in the selection by said exposure control unit of a different one of said exposure values the condition of one of said light sources will be changed.

3. In a camera as defined in claim 2, wherein said voltage-setting means comprises first, second and third further voltage dividers each connected across said voltage source and each having a tap connected to the emitter of a respective one of said transistors of said impedance means.

4. In a camera as defined in claim 2, wherein at least some of said further voltage dividers include variable resistors.

5. In a photographic camera, in combination, light-sensing means for sensing the prevailing scene brightness and for generating a light-dependent voltage having at least a first voltage value, a second voltage value greater than said first value, and a third voltage value greater than said second value, corresponding respectively to first, second and third levels of scene brightness; an automatic exposure control unit operative for automatically selecting as a function of prevailing scene brightness any one of a plurality of exposure values including a first, a second and a third exposure value respectively corresponding to said first, second and third levels of scene brightness; and at least a first, second and a third light source means each having a first condition and a second condition, one of said conditions being an illuminating condition and the other of said conditions being a non-illuminating condition, each connected to said light-sensing means for simultaneous receipt of said light-dependent voltage, and said first, second and third light source means being operative for assuming said first condition whenever and while said light-dependent voltage exceeds said first, second and third voltage values, respectively, whereby while said automatic exposure control unit selects said first exposure value said first light source means is in said first condition and said second and third light source means are in said second condition, and while said automatic exposure control unit selects said second exposure value said first and second light source means are in said first condition and said third light source means is in said second condition, and while said automatic exposure control unit selects said third exposure value said first, second and third light source means are all in said first condition, said light-sensing means including a voltage source, a photoelement and a resistor connected in series with said photoelement to form a voltage divider connected across said voltage source and having a voltage divider tap, and said first, second and third light source means comprising respective first, second and third light sources each having two terminals, and respective first, second and third further voltage dividers each connected across said voltage source and each having a voltage divider tap connected to one terminal of the respective light source, and first, second and third diodes each connecting the other terminal of the respective light source to said voltage divider tap of said voltage divider of said light-sensing means.

* * * * *